US012655940B2

(12) United States Patent
Yang et al.

(10) Patent No.: US 12,655,940 B2
(45) Date of Patent: Jun. 16, 2026

(54) ISOLABLE DOUBLE-WALLED INSULATION TANK FOR LAUNCH VEHICLE

(71) Applicant: INNOSPACE CO., LTD., Sejong (KR)

(72) Inventors: Chang Hwan Yang, Sejong (KR); Do Yun Won, Sejong (KR); Soo Jong Kim, Sejong (KR); Hun Jung, Sejong (KR)

(73) Assignee: INNOSPACE CO., LTD., Sejong-si (KR)

( * ) Notice: Subject to any disclaimer, the term of this patent is extended or adjusted under 35 U.S.C. 154(b) by 0 days.

(21) Appl. No.: 18/829,743

(22) Filed: Sep. 10, 2024

(65) Prior Publication Data

US 2025/0003553 A1 Jan. 2, 2025

Related U.S. Application Data

(63) Continuation of application No. PCT/KR2023/003650, filed on Mar. 20, 2023.

(30) Foreign Application Priority Data

Mar. 23, 2022 (KR) ........................ 10-2022-0036008

(51) Int. Cl.
*F17C 1/12* (2006.01)
*F17C 3/02* (2006.01)

(52) U.S. Cl.
CPC ........ *F17C 3/02* (2013.01); *F17C 2201/0109* (2013.01); *F17C 2203/012* (2013.01);
(Continued)

(58) Field of Classification Search
CPC ........ F17C 2203/012; F17C 2201/0123; F17C 2203/0629; F17C 1/12; F17C 3/02;
(Continued)

(56) References Cited

U.S. PATENT DOCUMENTS 3,168,817 A 2/1965 Beckman et al.
3,335,903 A * 8/1967 Anderson ............ B65D 90/022 220/560.04

(Continued)

FOREIGN PATENT DOCUMENTS

EP 3875832 A1 9/2021
JP 2021-011948 A 2/2021

(Continued)

*Primary Examiner* — Stephen J Castellano

(74) *Attorney, Agent, or Firm* — United One Law Group LLC; Kongsik Kim; Jhongwoo Peck

(57) ABSTRACT

An isolable double-walled insulation tank for a launch vehicle includes a hollow open cylinder part having upper and lower end portions that are open in an upright state; an upper cap part for sealing the upper end portion of the open cylinder part; and a lower cap part for sealing the lower end portion of the open cylinder part. The open cylinder part includes a flat plate part having a flat outer peripheral surface; an uneven part slidably fitted and coupled to the flat plate part; and a plurality of load-dispersing spaces which are ring-shaped according to a portion of the uneven part being spaced from the flat plate part, and which are arranged to be spaced apart in the height direction of the open cylinder part.

4 Claims, 2 Drawing Sheets

(52) U.S. Cl.
CPC ................. *F17C 2203/0333* (2013.01); *F17C 2203/0629* (2013.01); *F17C 2221/011* (2013.01); *F17C 2270/0197* (2013.01)

(58) Field of Classification Search
CPC ........ F17C 3/08; F17C 13/008; F17C 13/001; F17C 2270/0186; F17C 2270/0194; F17C 270/0197
See application file for complete search history.

(56) References Cited

U.S. PATENT DOCUMENTS

| | | | | |
|---|---|---|---|---|
| 5,375,735 A * | 12/1994 | Huvey | .................... | B29C 63/24 220/62.19 |
| 2024/0369184 A1 * | 11/2024 | Scholz | ...................... | F17C 1/00 |

FOREIGN PATENT DOCUMENTS

| | | | |
|---|---|---|---|
| JP | 2021-041412 | A | 3/2021 |
| KR | 10-0395596 | B1 | 8/2003 |
| KR | 10-2013-0007699 | A | 1/2013 |
| KR | 10-1565881 | B1 | 11/2015 |
| KR | 10-2021-0034727 | A | 3/2021 |
| KR | 10-2021-0157232 | A | 12/2021 |
| WO | 2020/179956 | A1 | 9/2020 |

* cited by examiner

ISOLABLE DOUBLE-WALLED INSULATION TANK FOR LAUNCH VEHICLE

CROSS-REFERENCE TO RELATED APPLICATIONS

This application is a Continuation of International Application No. PCT/KR2023/003650 filed Mar. 20, 2023, which claims priority from Korean Application No. 10-2022-0036008 filed Mar. 23, 2022. The aforementioned applications are incorporated herein by reference in their entireties.

TECHNICAL FIELD

The present disclosure relates to an isolable double-walled insulation tank for a launch vehicle and, more particularly, to an isolable double-walled insulation tank for a launch vehicle, the tank implementing an isolable double-walled structure so as to improve the strength-to-weight performance of the insulation tank, that is, a specific strength, and minimizing heat transfer in order to improve insulation performance.

RELATED ART

In general, oxygen is in great demand for liquid propellants in rockets, oxygen oxidation in steel and chemical industries, welding in shipbuilding and mechanical engineering, medical use, or aeration in water treatment. Liquid oxygen is used in the aerospace industry to test rocket engines, etc., and in this case, the state of liquid oxygen is required to be high density. Accordingly, in order to increase the density of liquid oxygen, a method is used to reduce the volume of the liquid oxygen by lowering the temperature of the liquid oxygen. However, in implementing a method for lowering the temperature of liquid oxygen used in testing a rocket engine, liquid oxygen with a temperature of −183° C. at a pressure of 1 atmosphere is generally pressurized to about 100 atmospheres through a pressurization tank, and is transferred through pipes. In this case, the liquid oxygen reaching the engine to be tested undergoes a temperature increase due to heat intrusion from the piping and an increase in the internal energy of liquid due to pressurized pressure, causing the volume of the liquid to expand and the density of the liquid to decrease.

Accordingly, in order to maintain the temperature of the liquid oxygen reaching the engine under test at −183° C., the temperature of the liquid oxygen sent to the pressurization tank is required to be the value of −186° C. or less by considering temperature rising factors such as the heat intrusion from the piping and the increase in the internal energy due to pressurized pressure.

For the same reason as mentioned above, in order to lower the temperature of liquid oxygen to −183° C. or less, conventionally, 1) a method of supplying, through a cryogenic tank lorry, liquid oxygen that has previously been low-temperature-treated to a state of −186° C. or less at a liquid oxygen supply side, and 2) a method of maintaining a liquid oxygen to 0.7 bar or less by pumping the liquid oxygen from a cryogenic liquefied gas storage tank (double tank) have been used.

Prior art documents include Korean Patent No. 10-0395596 (published on Aug. 25, 2003, invention title: CRYOGENIC TRIPLE TANK FOR COOLING LIQUID OXYGEN USING LIQUID NITROGEN AS REGRIGERANT), and Korean Patent Application Publication No. 10-2021-0157232 (published Dec. 28, 2021, invention title: INSULATION STRUCTURE OF TANK FOR STORING LIQUEFIED GAS).

SUMMARY

The present disclosure has been made to solve the above problems occurring in the prior art, and is intended to propose an isolable double-walled insulation tank for a launch vehicle which implements an isolable double-walled structure to improve the specific strength-to-weight performance of the insulation tank and minimizes heat transfer to improve insulation performance.

In order to accomplish the objectives of the present disclosure described above, according to an exemplary embodiment, there is provided an isolable double-walled insulation tank for a launch vehicle according to the present disclosure, the insulation tank including: a hollow open cylinder part having an open upper end portion and an open lower end portion in an upright state thereof; an upper cap part configured to seal the upper end portion of the open cylinder part; and a lower cap part configured to seal the lower end portion of the open cylinder part, wherein the open cylinder part includes: a flat plate part having a flat outer peripheral surface; an uneven part slidably fitted and coupled to the flat plate part; and multiple load-dispersing spaces, wherein each of the load-dispersing spaces is ring-shaped due to a portion of the uneven part spaced apart from the flat plate part and is arranged to be spaced apart from each other in a height direction of the open cylinder part.

Here, the uneven part may include: coupling portions being spaced apart from each other and slidably supported on the flat plate part; and a curvature portion configured to connect two adjacent coupling portions to each other and to form the load-dispersing space.

Here, when a height of each of the coupling portions is h1, and a height of the curvature portion is h2, based on the open cylinder part in the upright state, a relational expression of h1:h2=1.0:1.6-2.0 (i.e., h2/h1=1.6-2.0) may be satisfied.

Here, when the height of the coupling portion is h1, and a maximum distance between the flat plate part and the curvature portion is d, based on the open cylinder part in the upright state, a relational expression of h1:d=1:0.4-0.6 (i.e., d/h1=0.4-0.6) may be satisfied.

Here, an insulation member may be filled in at least the load-dispersing space between the flat plate part and the uneven part.

According to the isolable double-walled insulation tank for a launch vehicle according to the present disclosure, it is possible to improve the specific strength-to-weight performance of the insulation tank by implementing an isolable double-walled structure, and to improve insulation performance by minimizing heat transfer.

In addition, according to the present disclosure, even if the sum of the thickness of the flat plate part and the thickness of the uneven part is substantially the same as the thickness of the conventional insulation tank, it is possible to increase the strength of the insulation tank relative to the total weight of the insulation tank, and to reduce the deformation rate of the open cylinder part 10 by 50% or more.

In addition, according to the present disclosure, through a coupling relationship between the uneven part and the load-dispersing space, it is possible to significantly reduce stress acting on the open cylinder part, and secure the structural stability of the insulation tank.

In addition, according to the present disclosure, it is possible to reduce the overall weight of the insulation tank through an air layer through the load-dispersing space.

In addition, according to the present disclosure, through the detailed coupling relationship of the uneven part, it is possible to stably form the load-dispersing space in the open cylinder part, and secure the uniform pattern of the uneven part.

In addition, according to the present disclosure, it is possible to ensure the dispersion of stress in the curvature portion having an arc shape, and minimize the deformation of the open cylinder part.

In addition, according to the present disclosure, through a ratio relationship between the coupling portion and the curvature portion, it is possible to minimize the deformation of the open cylinder part and prevent the strength of the open cylinder part from decreasing.

In addition, according to the present disclosure, through a ratio relationship between the coupling portion and the load-dispersing space, it is possible to minimize the deformation of the open cylinder part, and prevent the strength of the open cylinder part from decreasing.

In addition, according to the present disclosure, through the insulation member (not shown), it is possible to minimize the temperature change of liquid oxygen in the insulation tank, increase the stability of the liquid oxygen, increase the insulation performance of the inside and outside of the insulation tank, and minimize the deformation of the curvature portion.

In addition, according to the present disclosure, it is possible to minimize the thickness of each of the flat plate part and the uneven part in the open cylinder part, and to stably withstand the pressure of liquid oxygen filled in the insulation tank.

In addition, according to the present disclosure, through the combination of the flat plate part and the uneven part, it is possible to facilitate the movement of the uneven part in the flat plate part when contraction in the flat coupling portion or the arc-shaped curvature portion occurs due to liquid oxygen.

In addition, according to the present disclosure, through the structural shapes of the flat plate part and the uneven part, it is possible to improve the strength and rigidity of the uneven part against a predetermined pressure load inside the insulation tank. In addition, when the uneven part is deformed due to pressure load, the uneven part is in contact with the flat plate part, and the load of the uneven part is transferred to the flat plate part, which an outer wall, and stress thereof is also dispersed, resulting in improving the structural stability of the insulation tank against the pressure load.

In addition, according to the present disclosure, when liquid oxygen flows into the insulation tank, shrinkage thereof occurs, and the area of the uneven part, which is an inner wall, is larger than the area of the flat plate part which is the outer wall and is flat, and thus the amount of shrinkage of the uneven part, which is the inner wall, is greater than that of the flat plate part, which is the outer wall, and a fine gap is generated between the flat plate part and the uneven part, so it is possible to minimize heat transfer from the uneven part to the flat plate part. In other words, a primary insulation effect occurs through the fine gap, and a secondary insulation effect occurs through the insulation member (not shown) filled in the load-dispersing space, so it is possible to maximize the stability of liquid oxygen filled in the insulation tank, and to optimize the structure of the insulation tank for a launch vehicle.

In addition, since the insulation member (not shown) made of urethane is filled in the load-dispersing space, there is no contact between the flat plate part and the curvature portion, so stress acting on the flat plate part is very small, and even if a filling hole (not shown) is formed through the flat plate part, the flat plate part does not become structurally weak. Accordingly, it is possible to facilitate the filling of the insulation member (not shown) into the load-dispersing space through the filling hole (not shown).

DETAILED DESCRIPTION

Hereinafter, an embodiment of an isolable double-walled insulation tank for a launch vehicle according to the present disclosure will be described with reference to the accompanying drawings. In this case, the present disclosure is not restricted or limited by the embodiment. In addition, when describing the present disclosure, detailed descriptions of known functions or configurations may be omitted to make the gist of the present disclosure clear.

Figure 1:
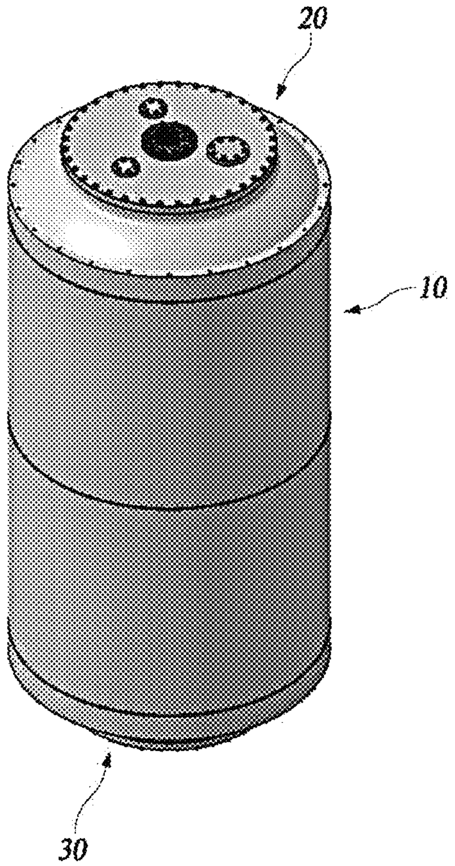
FIG. 1 is a perspective view illustrating an isolable double-walled insulation tank for a launch vehicle according to an embodiment of the present disclosure.
Figure 2:
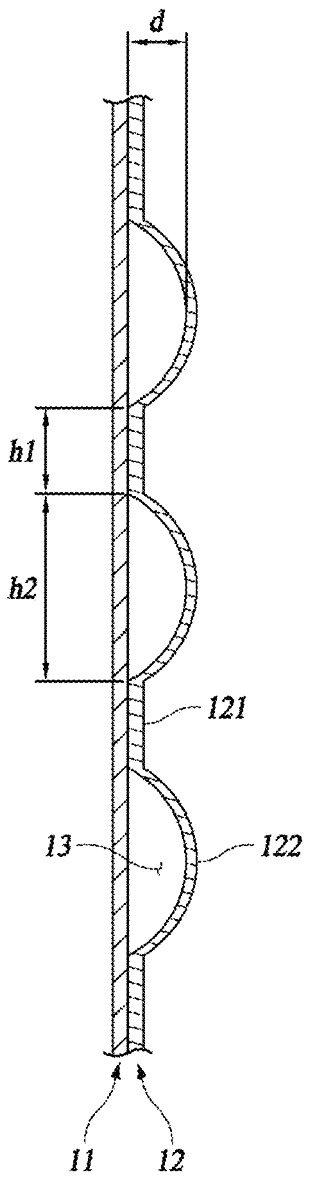
FIG. 2 is an enlarged longitudinal cross-sectional view illustrating an open cylinder part in the isolable double-walled insulation tank for a launch vehicle according to the embodiment of the present disclosure.

Referring to FIGS. 1 and 2, the isolable double-walled insulation tank for a launch vehicle according to the embodiment of the present disclosure may a container filled with liquid oxygen inside and may include an open cylinder part 10, an upper cap part 20, and a lower cap part 30.

The open cylinder part 10 has a hollow cylinder shape having an open upper end portion and an open lower end portion in an upright state thereof.

The open cylinder part 10 may include a flat plate part 11 having a flat outer peripheral surface, an uneven part 12 which is slidably coupled to the flat plate part 11, and multiple load-dispersing spaces 13, wherein each of the load-dispersing spaces 13 is ring-shaped due to a portion of the uneven part 12 spaced apart from the flat plate part 11 and is arranged to be spaced apart from each other in a height direction of the open cylinder part 10.

The flat plate part 11 and the uneven part 12 have a hollow cylinder shape with an upper end portion and a lower end portion opened in an upright state thereof.

The uneven part 12 may include coupling portions 121 which are spaced apart from each other and slidably supported by the flat plate part 11, and a curvature portion 122 which connects two adjacent coupling portions 121 to each other and forms each of the load-dispersing spaces 13.

Each of the coupling portion 121 and the curvature portion 122 has a ring shape.

The coupling portion 121 may be formed to be flat like the flat plate part 11 and be stably stacked and supported on the flat plate part 11, or may be arranged to be spaced apart from the flat plate part 11 to form a fine gap therebetween.

In a longitudinal cross section, the curvature portion 122 is formed to be recessed from the inner peripheral surface of the flat plate part 11, and is formed to protrude toward the center of the open cylinder part 10. In this case, the load-dispersing space 13 is formed between the flat plate part 11 and the curvature portion 122. The curvature portion 122 preferably has an arc shape in the longitudinal cross section.

h1 represents the height of the coupling portion 121 based on the open cylinder part 10 in the upright state, h2 represents the height of the curvature portion 122 based on the open cylinder part 10 in the upright state, and d represents a maximum distance between the flat plate part 11 and the curvature portion 122 based on the open cylinder part 10 in the upright state.

Here, since the relational expression of h1:h2=1.0:1.6-2.0 is satisfied, it is possible to minimize the stress or deformation of the insulation tank with a load on the internal pressure of the insulation tank, and to stabilize the overall structural performance of the insulation tank or to prevent an overall structural performance thereof from deteriorating. In other words, it is sufficient that h2 is 1.6 times or more of h1, and 2.0 times or less of h1.

However, in the relational expression of h1:h2=1.0:1.6 or less, the strength of the uneven part 12, which is an inner wall, decreases, and a load applied to the flat plate part 11, which is an outer wall, increases. As a result, with a load on the internal pressure of the insulation tank, a load transferred from the uneven part 12, which is the inner wall, to the flat plate part 11, which is the outer wall, increases, thereby increasing the possibility of increasing the stress or deformation of the insulation tank.

In addition, in the relational expression of h1:h2=1.0: more than 2.0, a load is not efficiently transferred from the uneven part 12, which is the inner wall, to the flat plate part 11, which is the outer wall, so stress that the uneven part 12, which is the inner wall, must bear is high. As a result, there is a problem that the overall structural performance of the insulation tank is deteriorated.

In addition, since the relational expression of h1:d=1:0.4-0.6 is satisfied, it is possible to stabilize the strength performance of the open cylinder part 10 and the structural performance of the uneven part 12 by minimizing the deformation of the flat plate part 11, or to prevent the strength performance of the open cylinder part 10 and the structural performance of the uneven part 12 from being deteriorated. In other words, it is sufficient that d is 0.4 times or more of h1, and 0.6 times or less of h1.

However, in the relational expression of h1:d=1: less than 0.4, the amount of shrinkage of the curvature portion 122 caused by liquid oxygen is relatively small, so a gap between the flat plate part 11, which is the outer wall, and the uneven part 12, which is the inner wall, decreases relatively, thereby reducing insulation performance, and in the uneven part 12, which is the inner wall, the deformation of the curvature portion 122 increases, thereby increasing a load transmitted to the flat plate part 11, which is the outer wall. As a result, the deformation of the flat plate part 11 increases relatively, so there is a problem that the strength performance of the open cylinder part 10 is deteriorated.

In addition, in the relational expression of h1:d=1:more than 0.6, the uneven part 12, which the inner wall, may be more excellent in terms of movability, but as the curvature of the curvature portion 122 increases, the length of the curvature portion 122 increases, and thus the amount of shrinkage of the curvature portion 122 caused by cryogenic liquid oxygen also increases, thereby causing an increase in structural stress due to the shrinkage. As a result, there is a problem that the structural performance of the uneven part 12, which is the inner wall, is deteriorated.

In addition, to improve insulation performance, an insulation member (not shown) may be filled in the load-dispersing space 13 between the flat plate part 11 and the uneven part 12. The insulation member (not shown) may be stably filled in the load-dispersing space 13 through a filling hole (not shown) formed through the flat plate part 11 at a portion in which the load-dispersing space 13 is formed.

The upper cap part 20 seals the upper end portion of the open cylinder part 10. The upper cap part 20 advantageously has a dome shape to withstand a contraction force caused by liquid oxygen.

The lower cap part 30 seals the lower end portion of the open cylinder part 10. The lower cap part 30 advantageously has a dome shape to withstand a contraction force caused by liquid oxygen.

After liquid oxygen is filled in a conventional insulation tank including a single cylindrical plate with a thickness of 2 mm and the insulation tank according to the embodiment of the present disclosure in which the flat plate part 11 has a thickness of 1 mm and the uneven part 12 has a thickness of 1 mm, the deformation of each of the cylindrical plate and the open cylinder part 10 is measured. As a result, it may be seen that the open cylinder part 10 is swollen about 50% less than the cylindrical plate.

In addition, as a result of measuring a stress acting on each of the cylindrical plate and the open cylinder part 10, it may be seen that the stress of about 249 MPa is generated in the cylindrical plate, and the stress of about 180 MPa is generated in the flat plate part 11 of the open cylinder part 10.

According to the isolable double-walled insulation tank for a launch vehicle described above, it is possible to improve the specific strength-to-weight performance of the insulation tank by implementing the isolable double-walled structure, and to improve insulation performance by minimizing heat transfer.

In addition, even if the sum of the thickness of the flat plate part 11 and the thickness of the uneven part 12 is substantially the same as the thickness of the conventional insulation tank, it is possible to increase the strength of the insulation tank relative to the total weight of the insulation tank, and to reduce the deformation rate of the open cylinder part 10 by 50% or more.

In addition, through a coupling relationship between the uneven part 12 and the load-dispersing space 13, it is possible to significantly reduce stress acting on the open cylinder part 10, and secure the structural stability of the insulation tank.

In addition, it is possible to reduce the overall weight of the insulation tank through an air layer through the load-dispersing space 13.

In addition, through the detailed coupling relationship of the uneven part 12, it is possible to stably form the load-dispersing space 13 in the open cylinder part 10, and secure the uniform pattern of the uneven part 12.

In addition, it is possible to ensure the dispersion of stress in the curvature portion 122 having an arc shape, and minimize the deformation of the open cylinder part 10.

In addition, through a ratio relationship between the coupling portion 121 and the curvature portion 122, it is possible to minimize the deformation of the open cylinder part 10 and prevent the strength of the open cylinder part 10 from decreasing.

In addition, through a ratio relationship between the coupling portion 121 and the load-dispersing space 13, it is possible to minimize the deformation of the open cylinder part 10, and prevent the strength of the open cylinder part 10 from decreasing.

In addition, through the insulation member (not shown), it is possible to minimize the temperature change of liquid oxygen in the insulation tank, increase the stability of the liquid oxygen, increase the insulation performance of the inside and outside of the insulation tank, and minimize the deformation of the curvature portion 122.

In addition, it is possible to minimize the thickness of each of the flat plate part 11 and the uneven part 12 in the open cylinder part 10, and to stably withstand the pressure of liquid oxygen filled in the insulation tank.

In addition, through the combination of the flat plate part 11 and the uneven part 12, it is possible to facilitate the movement of the uneven part 12 in the flat plate part 11 when contraction in the flat coupling portion 121 or the arc-shaped curvature portion 122 occurs due to liquid oxygen.

In addition, through the structural shapes of the flat plate part 11 and the uneven part 12, it is possible to improve the strength and rigidity of the uneven part 12 against a predetermined pressure load inside the insulation tank. In addition, when the uneven part 12 is deformed due to pressure load, the uneven part 12 is in contact with the flat plate part 11, and the load of the uneven part 12 is transferred to the flat plate part 11, which the outer wall, and stress thereof is also dispersed, resulting in improving the structural stability of the insulation tank against the pressure load.

In addition, when liquid oxygen flows into the insulation tank, shrinkage thereof occurs, and the area of the uneven part 12, which is the inner wall, is larger than the area of the flat plate part 11 which is the outer wall and is flat, and thus the amount of shrinkage of the uneven part 12 is greater than that of the flat plate part 11, and a fine gap is generated between the flat plate part 11 and the uneven part 12, so it is possible to minimize heat transfer from the uneven part 12 to the flat plate part 11. In other words, a primary insulation effect occurs through the fine gap, and a secondary insulation effect occurs through the insulation member (not shown) filled in the load-dispersing space 13, so it is possible to maximize the stability of liquid oxygen filled in the insulation tank, and to optimize the structure of the insulation tank for a launch vehicle.

In addition, since the insulation member (not shown) made of urethane is filled in the load-dispersing space 13, there is no contact between the flat plate part 11 and the curvature portion 122, so stress acting on the flat plate part 11 is very small, and even if the filling hole (not shown) is formed through the flat plate part 11, the flat plate part 11 does not become structurally weak. Accordingly, it is possible to facilitate the filling of the insulation member (not shown) into the load-dispersing space 13 through the filling hole (not shown).

As described above, the exemplary embodiment of the present disclosure have been described with reference to the drawings, but those skilled in the art may variously modify or change the embodiment within the scope of the spirit and scope of the present disclosure as set forth in the claims below.

REFERENCE NUMERALS

10: Open cylinder part
11: Flat plate part
12: Uneven part
121: Coupling portion
122: Curvature portion
13: Load-dispersing space
20: Upper cap part
30: Lower cap part
h1: Height of coupling portion
h2: Height of curvature portion
d: Maximum distance between flat plate part and curvature portion

What is claimed is:

1. An isolable double-walled insulation tank for a launch vehicle, the insulation tank comprising:
- a hollow open cylinder part having an open upper end portion and an open lower end portion in an upright state thereof;
- an upper cap part configured to seal the upper end portion of the open cylinder part; and
- a lower cap part configured to seal the lower end portion of the open cylinder part,
- wherein the open cylinder part comprises:
  - an outer cylindrical wall part having a smooth outer peripheral surface;
  - an uneven part slidably fitted and coupled to the outer cylindrical wall part; and
  - multiple load-dispersing spaces, wherein each of the load-dispersing spaces is ring-shaped due to a portion of the uneven part spaced apart from the outer cylindrical wall part and is arranged to be spaced apart from each other in a height direction of the open cylinder part, and
- wherein the uneven part comprises:
  - coupling portions being spaced apart from each other and slidably supported on the outer cylindrical wall part; and
  - a curvature portion configured to connect two adjacent coupling portions to each other and to form the load-dispersing space.

2. The insulation tank of claim 1, wherein, when a height of each of the coupling portions is h1, and a height of the curvature portion is h2, based on the open cylinder part in the upright state, a relational expression of h1:h2=1.0:1.6-2.0 is satisfied.

3. The insulation tank of claim 1, wherein, when the height of the coupling portion is h1, and a maximum distance between the outer cylindrical wall part and the curvature portion is d, based on the open cylinder part in the upright state, a relational expression of h1:d=1:0.4-0.6 is satisfied.

4. The insulation tank of claim 1, wherein an insulation member is filled in at least the load-dispersing space between the outer cylindrical wall part and the uneven part.

* * * * *